United States Patent [19]

Lestradet

[11] 4,350,293

[45] Sep. 21, 1982

[54] VEHICLE EQUIPPED WITH A LIQUID SPREADER DEVICE

[76] Inventor: Maurice C. J. Lestradet, 291 Avenue du Marechal de Lattre de Tassigny, 51230 Fere Champenoise, France

[21] Appl. No.: 187,802

[22] Filed: Sep. 16, 1980

[30] Foreign Application Priority Data

Oct. 15, 1979 [FR] France ............................ 79 25546

[51] Int. Cl.$^3$ .................... A01C 23/04; B05B 9/06; G05D 7/06
[52] U.S. Cl. .................................. 239/155; 222/617; 222/63
[58] Field of Search .................. 239/71, 74, 155, 156; 222/76, 614, 617, 613, 623–626

[56] References Cited

U.S. PATENT DOCUMENTS 4,023,020  5/1977  Lestradet ..................... 239/155 X
4,052,003  10/1977  Steffen ....................... 239/155 X

FOREIGN PATENT DOCUMENTS 2311283  12/1976  France .
2360352   3/1978  France .
2396353   1/1979  France .

OTHER PUBLICATIONS

"Application of Analog Conversion Products in Micro-Computers", by George F. Bryant, Datel Systems, Inc., Canton, Mass.

Primary Examiner—Andres Kashnikow
Attorney, Agent, or Firm—Andrus, Sceales, Starke & Sawall

[57] ABSTRACT

This device comprises a tank for the product to be spread, a pump inserted in a conduit connecting the tank to a spreader system, a regulating valve actuated by a driver. An electronic system controls the driver as a function, on one hand of the speed of the vehicle and, on the other hand, of reference data. The regulating valve is inserted in a regulating conduit which is connected in parallel with the pump. The electronic system comprises a regulator including a microprocessor which is, on one hand, connected to data encoders for encoding data relating to the amount of product to be spread per unit area and to a parameter relating to the type of spray nozzles to be chosen for said spreader system and, on the other hand, connected to at least one interface circuit connecting the microprocessor to a speed detector and a pressure detector and to an interface circuit connected with said valve.

6 Claims, 4 Drawing Figures

VEHICLE EQUIPPED WITH A LIQUID SPREADER DEVICE

The present invention relates to methods for spreading liquid fertilizers, insecticides or the like. and more particularly relates to a vehicle on wheels provided with a spreader device whose delivery or flow is governed by the speed of displacement of the vehicle over the ground to be treated.

In some vehicles employed in agriculture, the speed is measured by means of a non driving wheel so as to avoid possible errors in the measurement which occur when a driving wheel slips.

Spreader vehicles are also known in which the product to be spread has its flow controlled by a valve controlled by electronic menas which produce signals controlling the valve from, on one hand, reference data relating in particular to the spraying rate to be achieved and the types of spraying nozzles to be used in the spreader device proper, which is usually formed by a spraying system and, on the other hand, data which relate to the instantaneous speed of the vehicle and to the pressure of the product and are applied to the electronic means by suitable measuring detectors.

Among the arrangements of this type, there is known in particular a vehicle on wheels provided with a spreader device whose flow is governed by the speed of displacement, said device comprising a tank containing the product to be spread, a pump which is connected to the outlet of the tank so as to draw off said product and to the inlet of a distribution chamber for transferring the product thereto a spreading system connected to the outlet of the distribution chamber, a regulating valve controlled by a servo motor supplied with energy by an electronic system as a function, on one hand, of the speed of the vehicle measured by a detector at a nondriving wheel of the vehicle and, on the other hand, of reference data, said regulating valve being inserted in a regulating conduit connecting the tank to supply piping which connects the outlet of the pump to the inlet of the distribution chamber, a pressure gauge continuously measuring the pressure in said distribution chamber and furnishing to the electronic system a signal which is compared with a reference signal furnished by a calculating or computer unit, said signal being a function of the speed of the vehicle and of the amount of product to be spread per unit area, said amount being determined by the control effected respectively by setting means setting the flow of the product to be spread and setting means for the type of nozzles the spreading system is equipped with.

Such an arrangement considerably reduces the number of interventions on the part of the user in the regulating operations which are always delicate to carry out and require good qualifications.

An object of the invention is to provide a spreader vehicle which is still more simple to regulate and use relative to known arrangements.

According to the invention, there is provided a vehicle on wheels which is provided with a spreader device comprising a tank for the product to be spread, a pump inserted in a conduit connecting the tank to a spreader system, a regulating valve actuated by driving means controlled by an electronic system as a function, on one hand, of the speed of the vehicle and, on the other hand, of reference data, said regulating valve being inserted in a regulating conduit which is connected in parallel with said pump, wherein said electronic system comprises a regulator comprising a microprocessor which is connected, on one hand, to means for encoding data relatng to the amount of product to be spread per unit area and to a parameter relating to the type of spray nozzles to be employed for said spreading system and, on the other hand, to at least one interface circuit connecting the microprocessor to a speed detector and to a pressure detector and to an interface circuit connected to said valve.

Further features of the invention will be apparent from the ensuing description. In the accompanying drawings which are given solely by way of example:

Figure 1:
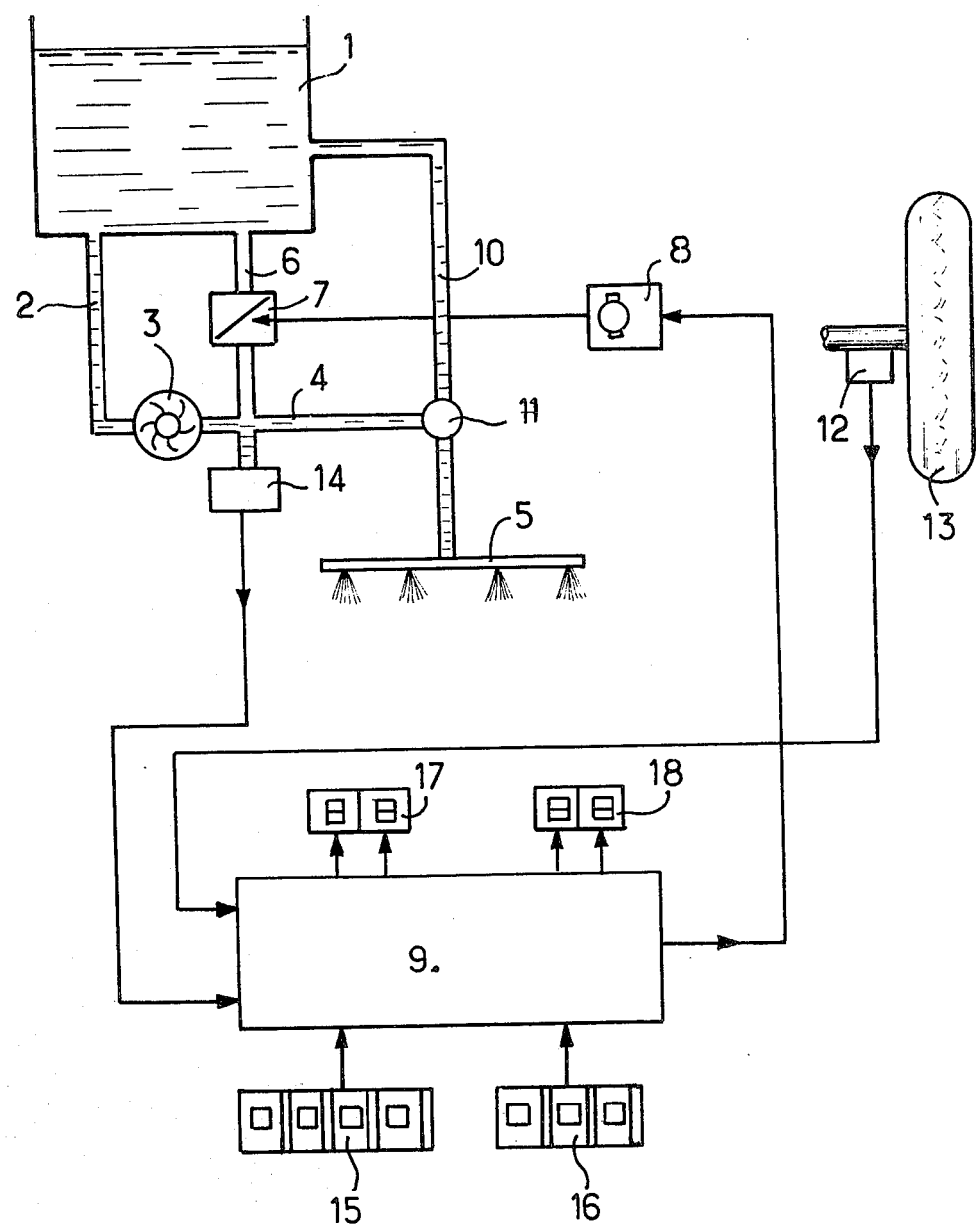
FIG. 1 is a diagrammatic view of a spreader device with which a vehicle according to the invention is equipped.

The spreader device shown in FIG. 1 comprises a tank 1 for the product to be spread connected by conduit 2 to a pump 3 which is adapted to drive the product to be spread along a conduit 4 to a spraying system 5 provided with suitable nozzles (not shown).

The tank 1 is also connected to the conduit 4 down stream of the pump 3 through a regulating conduit 6 in which there is inserted a regulating valve 7 which is coupled to an electric drive motor 8 controlled by an electronic regulator 9. The system 5 is also connected to the tank 1 through a branch conduit 11 into which opens the conduit 4 which connects the pump 3 to the spraying system 5. The connection between the conduits 4 and 10 is by way of a by-pass valve 11. The electronic regulator 9 is, on one hand, connected to a speed detector 12 associated with a non-driving wheel 13 of the spreader vehicle and to a pressure detector 14 adapted to measure the pressure prevailing in the conduit 4 down stream of the pump 3 and, on the other hand, connected to a device 15 for inserting data relating to the amount Q of liquid to be spread per unit area and to a device 16 for inserting data k relating to the type of nozzles the system 5 must be equipped with.

The devices 15 and 16 are advantageously formed by elements having encoding wheels. The regulator 9 is connected to a speed indicator 17 and to a pressure indicator 18 both of which are numerical indicators.

Figure 3:
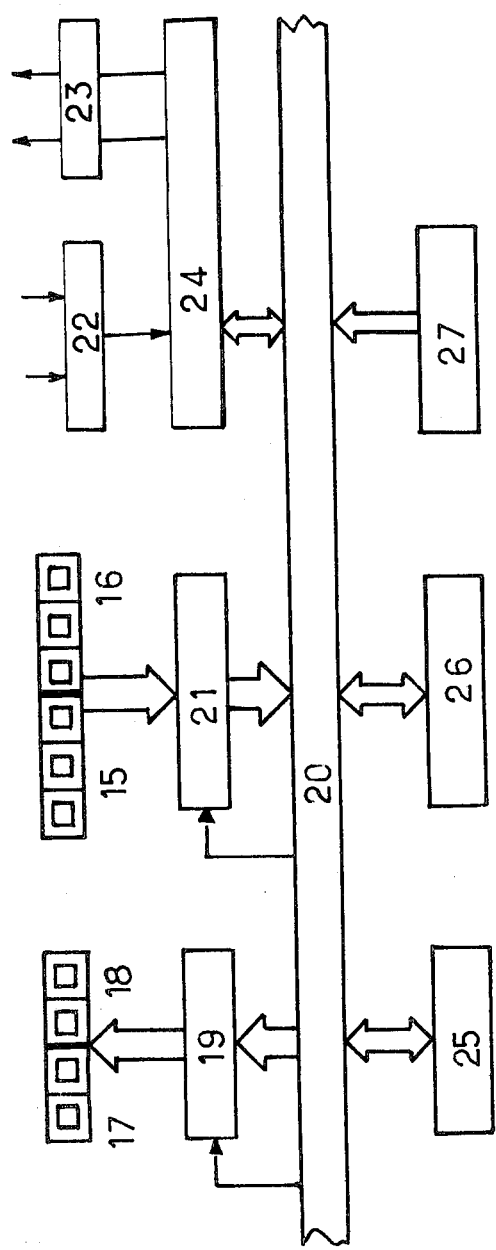
FIG. 3 is a synoptic diagram showing the structure of the calculator employed.

In the present invention, the electronic regulator advantageously comprises a microprocessor to which the pressure and speed detectors are connected through an interface circuit shown in FIG. 4 which will be described hereinafter. The electronic regulator is in fact formed, as shown in FIG. 3, by a calculator which comprises an assembly of bus conductors 20 to which are connected encoding units 15, 16 for inserting data relating to the afore mentioned parameters Q and K. These encoding units 15 and 16 are connected to the bus conductors through amplifier 21.

The bus conductors 20 are also connected to the speed detector 21 and pressure detector 14 through an interface circuit 22 and to the valve 7, 8 through an interface circuit 23.

In the presently-described embodiment, an input/output unit 24 is futher more interposed between the conductors 20 and said interface circuits 22, 23.

The regulator further comprises a microprocessor 25, a working memory 26 and a static memory 27. As concerns the input/output unit 24, it is integrated with certain types of microprocessors such as the processor SC/MP11 manufactured by National Semiconductor Corporation of Santa Clara, Calif. The interface circuit associated with the speed and pressure detectors 12 and 14 is shown in FIG. 4. It comprises a circuit 28 for shaping the signals delivered by the speed detector 12. The output of the circuit is connected to an input of a first AND gate 29 whose second input is connected to a detector selecting conductor 30. It further comprises a voltage-frequency converter circuit 31 whose input is connected to the output of the pressure detector 14 and whose outpt is connected to an input of a second AND gate 32 through a shaping circuit 33. The second input of the AND gate 32 is connected to the detector selecting conductor 30 through an inverter 34.

The outputs of the gates 29 and 32 are each connected to an input of the third OR gate 35 whose output is connected to the rest of the regulator 9 through a monostable multivibrator 36.

The interface circuit 23 connected with the valve 7, 8 is formed by a simple transistor power stage and will therefore not be further described in detail.

The operation of the device will be described with reference to the block diagram of FIG. 2. However, in order to facilitate the understanding of this diagram, the problem to be solved should first be described with precision.

It concerns the spreading of an amount Q e of liquid over an area S, it being known that the spreader vehicle moves at a speed V and that the spraying system has a delivery or flow D.

In a concrete example, it will be supposed that the trail of liquid left on the ground by the system is 0.5 m. Knowing that the distance travelled through L is equal to the product V×t, namely the speed multiplied by the time, the area treated for one passage is:

$$S = V \times t \times 0.5$$

whence $$t = (S/V \times 0.5)$$

The parameter Q, which is the amount of liquid spread per unit area, is defined by the relation:

$$Q = (Qe/S)$$

Now,
$$Qe = D \times t = (D \times S)/(V \times 0.5)$$

and $$Q = (D/V \times 0.5)$$

Thus, the parameter Q may be defined by the general relation:

$$Q = K(D/V)$$

in which K is a constant (1).

Now, as the parameter D is difficult to measure, it is often replaced by the pressure P in the conduits related to the delivery or flow by a relation of the form $$D = K\sqrt{P}$$

in which K is a coefficient depending on the type of nozzle employed and on the density of the liquid spread.

The relation (1) then becomes:

$$Q = K\left(\frac{K\sqrt{P}}{V}\right) \tag{2}$$

It will be observed that the parameters k and Q, one of which depends on the type of nozzle employed and on the type of liquid spread whereas the other depends on the desired treatment, do not vary during the spreading operation.

Note, moreover, that, in order that the relation (2) always be satisfied, the regulator must act on the pressure P if the speed V of the vehicle varies.

Figure 2:
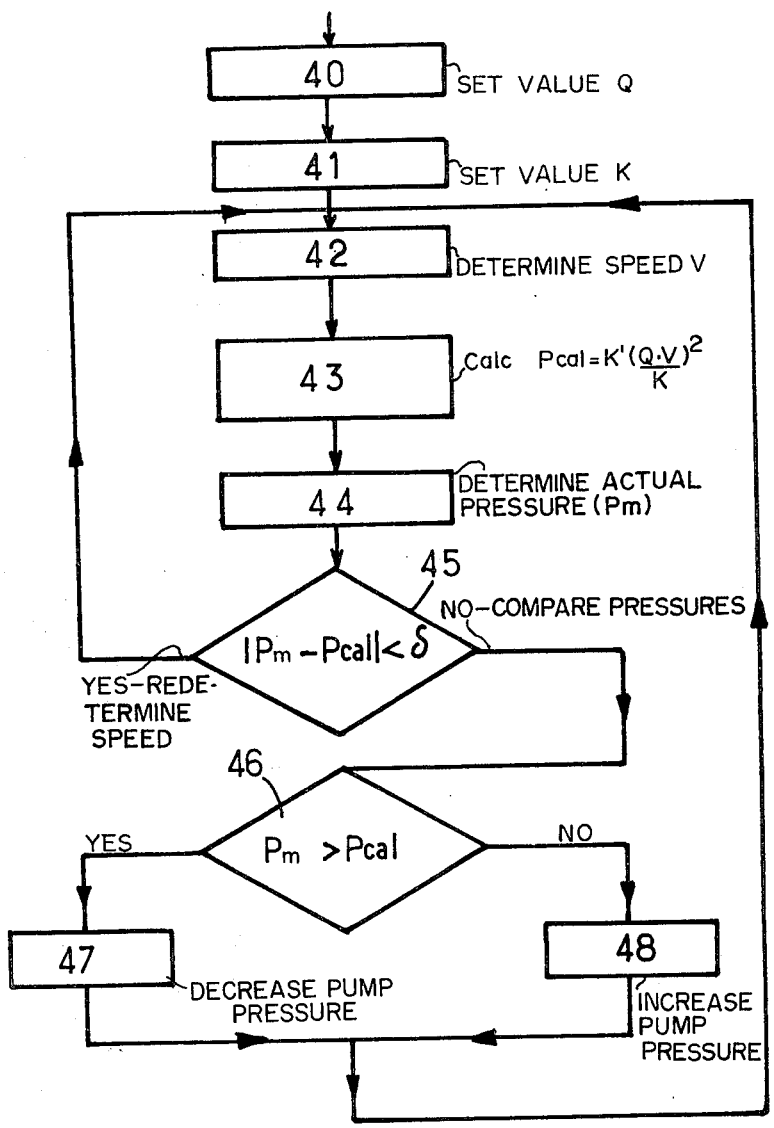
FIG. 2 is a block diagram showing the operation of the microprocessor employed in the device of FIG. 1.

In the course of the description of the block diagram of FIG. 2, the following data will be used:

Pcal which is the calculated value of the pressure obtained from the relation (2) and which is the desired pressure at the outlet of the pump 3;

Pm which is the instantaneous pressure furnished by the detector 14;

δ which is a small pressure range adapted to avoid a permanent correction of the pressure on the part of the system, even if the speed is constant.

Consequently, when the system has been stabilized, the pressure Pm must satisfy the relation:

$$Pcal - d \leq Pm \leq Pcal + \delta$$

With reference to the block diagram of FIG. 2, the values of Q and k are first set, these operations being embodied by the rectangle 40 and 41 respectively.

Then, as indicated by the rectangle 42, the speed V is read off, followed by the calculation of the pressure $$Pcal = K'\left(\frac{Q \times V}{k}\right)^2$$

at 43. Thereafter, the measured pressure is read off at 44.

Figure 4:
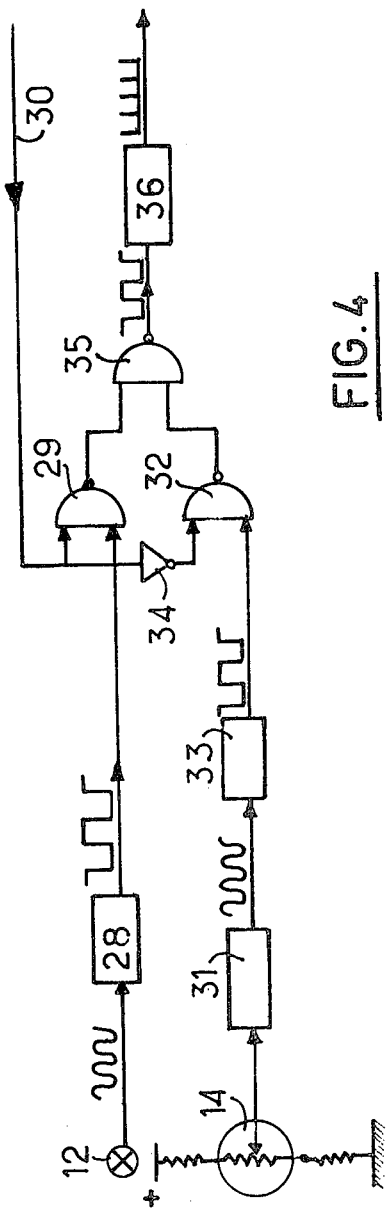
FIG. 4 is a diagram of the interface between the speed and pressure detectors and the microprocessor.

The interface circuit of FIG. 4 permits the selection of the detector which must transmit its information to the electronic regulator.

For this purpose, a detector selecting signal is applied to the conductor 30 so that, when the gate 29 receives a binary 1 on its corresponding input, the gate 32 receives an 0 owing to the presence of the inverter 34. In this case, it is the signals from the speed detector which are transmitted through the gate 29 to the gate 35 and to the monostable circuit 36 which converts then into a pulse train in which the duration or interval between two pulses is inversely proportional to the value to be measured.

These pulses trains are applied to the switch-off input unit (output 24 of the microprocessor 25).

It will be understood that the signals coming from the pressure detector 14 are selected in an analogous manner when the selection signal in the conductor 30 assumes a 0 binary value, which closes the gate 29 and causes the gate 32 to conduct.

The measurement of the interval between two output pulses of the monostable circuit 36 is measured by continously incrementing a counter (not shown).

It will be understood that the interface circuit of FIG. 4 may be replaced by two distinct circuits which permanently receive the data from the detectors 12 and 14.

With reference again to FIG. 2, the diamond 45 indicates the comparison of 1 Pm−Pcal 1 with δ.

If this difference is less than δ, the servo operation stops there and a new reading of V is recommenced.

In this difference is greater than δ, Pm is compared with Pcal, as shown by the diamond 46. If Pm>Pcal, the pressure at the outlet of the pump 3 (FIG. 1) is decreased at 47. In the opposite case, this pressure is increased and the aforementioned operations are recommenced by the reading off of the speed of the wheel 13 of the vehicle.

Thus, it is clear that, owing to the arrangement just described, the operations which must be carried out by the user of the spreader device are reduced to the setting of the amount Q of liquid to be spread per unit area and of the value k corresponding to the type of nozzles to be used.

The remaining operations are fully automatic.

It is essential to note that the most important advantage resulting from the invention resides in the fineness of the regulation possible with the use of a digital circuit and more particularly in the introduction of variables by means of digital encoding means. Indeed, it is possible to, on one hand, employ a device with a very large number of very varied nozzles and, on the other hand, finely control the amount of products to be spread to within one centiliter.

It should indeed be recalled that with prior devices, the variables were inserted by means of setting knobs which carried a limited number of graduations and consequently only permitted operating with a limited number of different nozzles. Thus, if the manufacturer of the prior devices provided setting knobs for the purpose of the use of this device with a given series of nozzles (which series is usually limited to about ten types of different nozzles), if subsequently the user desired to adapt to the same device a different series of nozzles it was practically impossible for him to adapt the existing setting knobs provided by the manufacturer to this new series of nozzles. This is in particular the case when the devices are exported from one country to another where the manufacturing standards or the conditions of utilisation require the use of a series of totally different nozzles.

On the other hand, in using a device provided with a circuit according to the invention, whose input values are indicated by means of digital encoding means, no adaptation is necessary since the encoding permits the use of infinite numbers of coefficients and therefore a number of nozzles of different types which is as large as desired.

With the prior devices, if it were decided, in spite of the considerable difficulties involved, to adapt the existing circuits to the use of different nozzles, it would be necessary to modify, not only the setting knob itself, but also a certain number of elements of the associated input circuit, such as, for example, the resistors of the regulating potentiometers. In certain cases, it would even be necessary, in order to avoid a excessively complex operation, to replace the whole of the calculating unit previously used.

With the device according to the invention, it is even possible to employ nozzles of a type which are distinctly different from that used in conventional practice, such as, for example, special very large nozzles which permit the spreading of fertilizers in suspension.

I claim:

1. A control system for a vehicle mounted spreader for dispensing a desired quantity of material per unit of surface area (Q), said quantity being responsive to the to the pressure (Pm) in the spreader, said system comprising:
   a reservoir (1) for the material;
   a conduit (2, 4) connecting said reservoir with the spreader;
   a pump (3) inserted in said conduit;
   means (14) for sensing the actual pressure (Pm) in the spreader;
   a controllable valve (7, 8) for controlling the pressure (Pm) in the spreader and hence the amount of material dispensed by the spreader;
   means (12) for sensing the speed of the vehicle (V); and
   a controller (9, 25) for controlling said valve, said controller comprising encoding means for producing a digital quantity signal relating to the desired amount of material to be spread per unit area (Q), encoding means for producing a digital parameter signal (k) relating to the type of spray nozzles incorporated in the spreader, interface means responsive to said pressure sensing means and speed sensing means for providing digital pressure (Pm) and speed signals (V), and a microprocessor coupled to said encoding means and said interface means for producing a digital desired system pressure signal (Pcal) corresponding to the system pressure necessary to provide a desired material quantity per unit area, said microprocessor being responsive to said digital desired pressure signal (Pcal) and said digital system pressure signal (Pm) for producing a digital correction signal, said controller being connected to said valve for actuating said valve in accordance with said correction signal for causing the actual pressure to approach the necessary system pressure.

2. A control system as claimed in claim 1 wherein said regulator is further defined as having a correction signal deadband δ between the necessary system pressure (Pcal) and the actual system pressure (Pm) such that when the difference falls within the band, actuation of said valve does not take place.

3. A control system as claimed in claim 1 wherein said interface means between said microprocessor and said speed sensing means and pressure sensing means interface includes detector selecting means (29, 32, 35) for allowing application to said microprocessor of data from a selected one of said speed and pressure sensing means responsive to a detector selection signal (30) applied to an input of said interface means.

4. A control system as claimed in claim 3 wherein said interface means comprises two signal channel means connected to said speed sensing means and to said pressure sensing means, respectively, said signal channel means having circuits (29, 31) for shaping the signals received from said speed sensing means and pressure sensing means, said signal shaping circuits being inserted in said channels upstream of said detector selecting means.

5. A control system as claimed in claim 4 wherein the signal channel for said pressure sensing means includes a voltage-frequency converter (33) inserted therein ahead of said shaping circuit.

6. A control system as claimed in claim 3 wherein said detector selecting means include AND gates (29, 32), each of said gates having one input connected to the associated sensing means and another input connected to a detector selecting signal conductor (30), signal inverter means (34) being inserted in said detector selecting signal conductor at the input of one of said gates, the output of said AND gates being connected to the input of an OR gate (35), the output of said OR gate being connected to said microprocessor through a monostable circuit (36).

* * * * *